Dec. 11, 1934.　　　C. MATHYS-MÜLLER　　　1,983,804
EPICYCLIC GEARING, INTENDED PARTICULARLY FOR POWER DRIVEN VEHICLES
Filed July 27, 1933
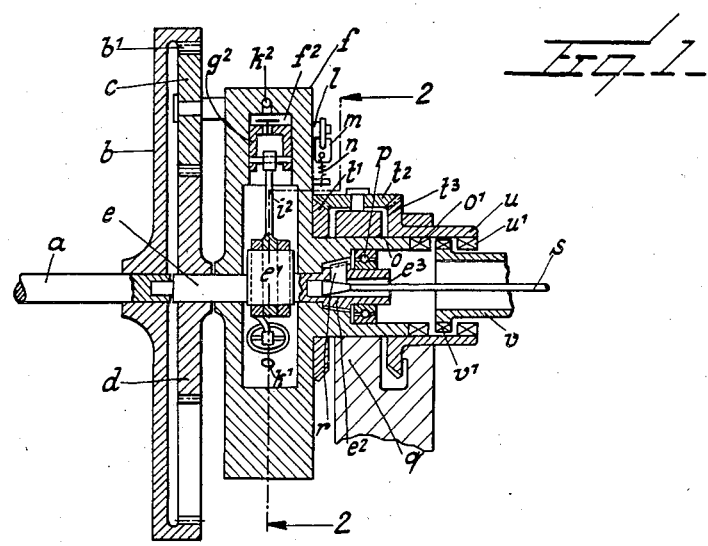
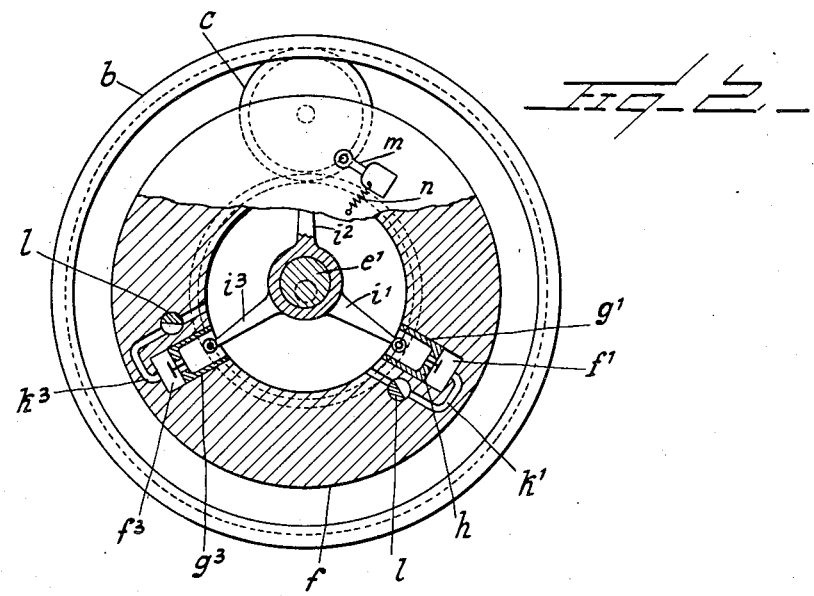

Patented Dec. 11, 1934

1,983,804

UNITED STATES PATENT OFFICE 1,983,804

EPICYCLIC GEARING, INTENDED PARTICULARLY FOR POWER DRIVEN VEHICLES

Carl Mathys-Müller, Zollikerberg, Switzerland

Application July 27, 1933, Serial No. 682,501
In Germany August 6, 1932

5 Claims. (Cl. 74—293)

The present invention relates to an epicyclic or planetary gear, intended more particularly for power driven vehicles, and having an automatically variable brake resistance acting between the epicyclic-gear carrier and the planetary wheels for the purpose of adapting the gear ratio or gear-transmission to the load, the said brake resistance consisting of one or more liquid piston brakes having their liquid outflow controlled by centrifugal weights, the brakes being fitted on the epicyclic-gear carrier and operated by eccentrics, cranks or the like in accordance with the rotary motion of the gear carrier.

In known gears of this type, the epicyclic-gear carrier is mounted on the driving shaft and carries the brake-cylinders while the cranks or eccentrics which operate the brake pistons are rigidly connected with the epicyclic gear wheels. There is only one sun wheel employed, which is carried on the driven or cardan shaft. The brake cylinders, fitted on the epicyclic-gear carrier, discharge at their extremities remote from the operating eccentrics, into a collector chamber for the brake liquid. These discharge ends of the cylinders are equipped with flap valves which carry the centrifugal weights, the arrangement being such that the centrifugal force tends to keep the flap valves in the closed position.

These known types of epicyclic gears are subject, however, to several very serious drawbacks. As the planetary gear-carrier is carried on the driving shaft and the sun wheel, meshing with the planetary wheels, is mounted on the driven shaft, whenever the driven shaft is stationary the increase in the revolutions per minute of the driving shaft will lead to an increase in the brake resistance which will continue until the driven shaft moves off from its position of rest. If then, as is usually the case, the revolution speed of the driving shaft is kept constant, whenever the revolutions per minute of the driven shaft rise and the centrifugal weight load on the flap valves controlling the discharge of brake liquid remains unchanged, a decrease will occur in the stroke-frequency of the brake-pistons giving rise to a corresponding drop in the brake resistance. This simply means that the driven shaft cannot, in any circumstances, acquire the speed of rotation of the driving shaft and that an alternating increase and decrease will occur in the speed of rotation of the driven shaft before it arrives at a constant speed of revolution. The same applies to the case when the load increases on the driven shaft when rotating, as may happen for instance in driving up an incline. As the load on the driven shaft increases, the rotational speed of the driving shaft is first diminished so that the centrifugal weight load on the flap valves falls, with the result that the brake resistance falls also. In consequence of this, the speed of the driving shaft first increases and the repeated throttling of the liquid outflow thus caused leads in turn to a decrease in the revolution speed of the driving shaft. This intermittent and non-uniform working of the gear is highly undesirable and renders its use in practice as good as impossible.

A further radical defect in the known type of gear is that, as the brake pistons execute their suction strokes in their respective cylinders, a vacuum may be set up because the flap valves, swinging in front of the liquid discharge apertures, operate as non-return valves. This danger, which becomes more serious the higher the stroke frequency of the brake-piston, cannot be removed even by providing the brake cylinders, as is frequently done, with special, small openings for the brake liquid. As a result of this vacuum arising in the brake cylinders during the suction strokes of the brake pistons, an uncontrollable variation of the charge figure in the brake cylinders may be caused by the variation in the stroke frequency. There will, therefore, be no uniformity in the working of the liquid-brakes.

The purpose of the present invention is to introduce improvements in various respects in the epicyclic gear described above and to remedy the disadvantages shown to be inherent in the known types of gear. The characteristic and novel feature of the invention is that the epicyclic gear carrier can be coupled, either directly or through a reversing-gear, with the driven shaft and that the eccentrics or the like which operate the liquid brakes, are mounted on an auxiliary shaft coaxial with the driving and driven shafts but rotating independently, while one of the two sun wheels meshing in known manner with the planetary wheels, is mounted on the driving shaft and the other on the auxiliary shaft. From the point of view of operating efficiency, this new gear functions in a manner far more satisfactory than the gears of known types; since, as the revolutions per minute of the driving shaft fall during idle running, the driven shaft and with it the epicyclic-gear carrier stands still. The sun wheel, mounted on the driving shaft, drives the second sun wheel along with the auxiliary shaft through the planetary wheels. The brake pistons are operated by means of eccentrics or the like mounted on the latter shaft. If now the engine of the vehicle is speeded up, that is, the speed of the driving shaft is increased, the stroke speed of the brake pistons continues to increase until the driven shaft and with it the epicyclic-gear carrier moves off from the resting position. During this time the brake resistance no longer acts directly between the epicyclic-gear carrier and the epicyclic wheels but is transmitted to the latter through the auxiliary shaft and the second sun wheel. Simultaneously with the increase in the revolutionary speed of the epicyclic-gear carrier, the liquid-outflow channels become more and more closed under the influence of the centrifugal weights so that the brake resistance continues to increase until the epicyclic-gear carrier becomes more or less rigidly connected with the driving shaft. If the load on the driven shaft increases, as for instance when driving up an incline, the driving shaft and at the same time the epicyclic-gear carrier are decelerated. This leads to a fall in the brake resistance which is automatically and steadily controlled in such a way that as the engine speed remains approximately constant, the most favourable transmission is effected between the driving and the driven shafts without any oscillation in the rotary movement of either the one shaft or the other being possible.

In order to ensure a faultless functioning of the liquid-brake, that is to say, both a sensitive and precise regulation of the liquid outflow and also a steadily uniform charge of the brake cylinders, while avoiding a vacuum, arrangements are made in a second constructional form of the invention whereby each brake cylinder which extends radially from a central chamber in the epicyclic-gear carrier, is put into communication, above the piston, with the central hollow chamber in the epicyclic-gear carrier by a liquid channel extending through the body of the epicyclic-gear carrier and containing a cross-section regulator or valve, and each brake piston is provided with a port extending through its crown and controlled by a non-return valve opening only during the suction stroke.

The novel arrangement whereby the epicyclic gear-carrier is connected with the driven shaft and also with the second sun wheel, and the eccentrics or the like operating the brake-pistons are mounted on an auxiliary shaft, renders it possible by a simple device to couple the driven shaft rigidly with the driving shaft while cutting out the liquid brakes. To this end, arrangements are, according to the invention, made whereby the auxiliary shaft can be coupled with the epicyclic gear carrier. To do this a clamping stop may be used which may be rendered operative or non-operative by means of a rotary or displaceable rod extending in an axial direction through the driven shaft.

One form of practical construction is illustrated in the accompanying drawing in which, Fig. 1 illustrates the epicyclic gear in axial section.

Fig. 2 is a transverse section taken on the line 2—2 in Fig. 1.

The driving shaft $a$ carries the orbit wheel $b$ which is provided with internal gear teeth $b^1$. With these gear teeth mesh one or more epicyclic wheels $c$ with which engages a sun wheel $d$. This sun wheel $d$ is mounted on an auxiliary shaft $e$ coaxial with the driving shaft $a$ but independent of the latter, and the epicyclic-gear carrier is mounted so as to be free to rotate on the auxiliary shaft. The epicyclic-gear carrier takes the form of a housing $f$ made up of one or more sections and contains several radially-directed cylinder-bores $f^1$, $f^2$, $f^3$. In each cylinder bore reciprocates a piston $g^1$, $g^2$, $g^3$ respectively, the crown of which is provided with a port $h$ which can be closed by a non-return valve. The pistons are carried on connecting rods $i^1$, $i^2$, $i^3$, the common driving eccentric $e^1$ of which is carried by the shaft $e$. The outer extremities of the cylinder-bores $f^1$, $f^2$, $f^3$ communicate through the channels $k^1$, $k^2$, $k^3$, which extend through the body of the epicyclic-gear carrier, with the central hollow chamber of the housing $f$ surrounding the shaft $e$, and this housing $f$ is completely filled with a liquid, as for example, oil. Each of the channels $k^1$, $k^2$, $k^3$ contain a cross-section or flow regulator in the form of a rotary valve $l$ having a port opening in one side thereof, and extending parallel to the longitudinal axis of the gear. This rotary valve $l$ carries on its extremity, which projects out of the housing $f$, a weight-loaded lever $m$ which is subject to the influence of a spring $n$. The arrangement of the rotary valves $l$ and the weight-loaded levers $m$ is such that, when the housing $f$ rotates, the rotary valves $l$ are acted on by the centrifugal force of the weighted levers $m$ so as to close the channels $k^1$, $k^2$, $k^3$, so that the cross-section of the channels left free by the rotary valve becomes smaller the more rapidly the housing $f$ rotates. The cylinder bores $f^1$, $f^2$ $f^3$ and the pistons $g^1$, $g^2$, $g^3$ reciprocating therein thus form liquid brakes, the resistance of which is automatically controlled by the rotary valve $l$ and the weighted levers $m$.

The housing $f$ is provided on the side opposite to the sun wheel $d$ with a hollow projecting boss $o$, the bore of which is partly cylindrical and partly conical, and this boss is rotatable in a stationary bearing $q$. The cylindrical section of the bore contains a ball-bearing $p$ for one end of the auxiliary shaft $e$. The conical section of the bore of the boss $o$ is eccentrically arranged and encloses a concentrically fitted conical enlargement $e^2$ of the auxiliary shaft $e$. In this conical enlargement a conical roller $r$ is radially displaceable and its displacement is effected by a longitudinally movable rod $s$ which projects into an axial bore $e^3$ in the auxiliary shaft $e$ and engages with the conical roller by means of its conical, inner extremity. By movement of this rod $s$, the roller $r$ can be brought into and out of contact with the periphery of the eccentric, conical portion of the bore of the boss $o$ and in the former case the roller $r$ acts as a clamp stop, to effect a rigid coupling of the housing $f$ with the auxiliary shaft $e$.

On the exterior of the boss $o$ is mounted a bevel pinion $t^1$ which engages with a second pinion $t^2$ which is mounted so as to be free to rotate on a projection on the bearing $q$. A third pinion $t^3$ which meshes with the pinion $t^2$ is carried by a casing $u$ which is also rotatably mounted on the exterior of the boss $o$. The casing $u$ is provided at its free end with coupling teeth $u^1$ directed radially inwards and the corresponding end of the boss $o$ also possesses coupling-teeth $o^1$, which are spaced so as to correspond with the coupling teeth $u^1$. A sleeve $v$ having coupling teeth $v^1$ and connected with the shaft to be driven, which is not shown, can be displaced in the axial direction of the gear over such a distance that its coupling teeth $v^1$ can be brought into engagement with either the coupling teeth $o^1$ or with the coupling teeth $u^1$ or can be displaced to a position between the two teeth groups $o^1$ and $u^1$. When the teeth $v^1$ engage with the teeth $o^1$, the shaft to be driven is rotated along with the housing $f$. When the teeth $v^1$ engage with the teeth $u^1$, the shaft to be driven rotates in a direction opposite to the housing $f$. In the intermediate position of the coupling teeth $v^1$, shown in the drawing, the shaft to be driven will receive no rotary motion.

The housing $f$ coupled either directly or through the intermediate gear $t^1$, $t^2$, $t^3$ with the shaft to be driven, is brought to a standstill when the rotational speed of the shaft $a$ falls, that is to say, when the driving motor is running idle, because the resistance inertia of the shaft to be driven cannot be overcome by the brake resistance, caused by the motion of the pistons $g^1$, $g^2$, $g^3$, between the sun wheel $d$ and the housing $f$. When the speed of the shaft $a$ increases, the speed of the auxiliary shaft $e$ will first, when the housing $f$ is stationary, increase with that of the sun wheel $d$ and therewith the stroke frequency of the pistons $g^1$, $g^2$, $g^3$. There is, therefore, a corresponding increase in the brake resistance between the sun wheel $d$ or the epicyclic gear $c$ meshing therewith and the housing $f$, which is caused by the flow of liquid into the channels $k^1$, $k^2$, $k^3$. Finally, the housing $f$ and the driven shaft are moved from their position of rest. As the rotational speed of the housing $f$ increases, there results a further increase in the brake resistance brought about by the centrifugal weights $m$. The speed of the housing $f$ continues to increase until the most favourable transmission ratio between the driving shaft and the shaft to be driven has been reached.

What I claim as my invention and desire to secure by Letters Patent of the United States is:—

1. A variable gearing for the transmission of power comprising in combination a driving shaft, an orbit wheel thereon, an epicyclic wheel meshing with the orbit wheel, a carrier for said epicyclic wheel, a sun wheel engaging said epicyclic wheel, an independent auxiliary shaft carrying said sun wheel and disposed coaxially with relation to said driving shaft, the epicyclic wheel carrier being mounted on said auxiliary shaft, automatically variable braking means adapted to act between said epicyclic wheel carrier and the epicyclic wheel, said braking means including a cylinder carried on said wheel carrier and a piston operating in the cylinder, the cylinder having a liquid outflow opening, centrifugally actuated means controlling the flow of liquid through said opening and carried on the epicyclic wheel carrier, an eccentric carried by the auxiliary shaft and adapted to operate the piston in accordance with the rotational movement of the epicyclic wheel carrier, a driven shaft, a reversing gear rotatably mounted on the wheel carrier, and means whereby the wheel carrier may be either coupled directly with said driven shaft or through said reversing gear.

2. A variable gearing for the transmission of power including in combination a driving shaft, an orbit wheel thereon, a epicyclic wheel meshing with said orbit wheel, a carrier for said epicyclic wheel, a sun wheel engaging the epicyclic wheel, an independent auxiliary shaft carrying said sun wheel and disposed coaxially to said driving shaft, said epicyclic wheel carrier being mounted on said auxiliary shaft, automatically variable braking means adapted to act between said epicyclic wheel carrier and the epicyclic wheel whereby the transmission is adapted to the load, said braking means including a central liquid-containing chamber within the epicyclic wheel carrier, a cylinder formed in the epicyclic wheel, a piston operating therein, the cylinder extending radially from said central chamber and opening thereinto at its inner end, a passage between the head of said cylinder and said chamber, centrifugally operated controlling means controlling the flow through said passage, the piston having a non-return valve opening upon each suction stroke, an eccentric within the liquid containing chamber and adapted to operate said brake piston in accordance with the rotational movement of said epicyclic wheel carrier, a driven shaft, a reversing gear rotatably mounted on the epicyclic wheel carrier, and means for selectively coupling the driven shaft either directly to the wheel carrier or coupling the driven shaft to the reversing gear.

3. In a variable gearing as claimed in claim 1, means whereby said auxiliary shaft can be coupled to or uncoupled from said epicyclic wheel carrier.

4. A variable gearing for the transmission of power comprising in combination a driving shaft, an orbit wheel thereon, an epicyclic wheel meshing with said orbit wheel, a carrier for said epicyclic wheel, a sun wheel engaging said epicyclic wheel, an independent auxiliary shaft carrying said sun wheel and coaxial with said driving shaft, the epicyclic wheel carrier being mounted on said auxiliary shaft for rotation therearound, automatically variable resistance means adapted to act between said epicyclic wheel carrier and the epicyclic wheel whereby the transmission is adapted to the load and including a cylinder having a liquid outflow, centrifugally actuated controlling means for the liquid outflow and carried on said wheel carrier, a piston operating within said cylinder, an eccentric on the auxiliary shaft adapted to operate said piston in accordance with the rotational movement of the epicyclic wheel carrier, a driven shaft, a reversing gear mounted on said epicyclic wheel carrier, means whereby said wheel carrier may be selectively coupled with said driven shaft either directly or through said reversing gear, means disposed between said auxiliary shaft and the epicyclic wheel carrier whereby the auxiliary shaft may be coupled to the epicyclic wheel carrier or uncoupled therefrom, and a member extending in an axial direction through the driven shaft and controlling said coupling means.

5. A variable gearing for the transmission of power including in combination, a driving shaft, an orbit wheel thereon, an epicyclic wheel meshing with the orbit wheel, a carrier for said epicyclic wheel, a sun wheel engaging said epicyclic wheel, an independent auxiliary shaft carrying said sun wheel and coaxial with said driving shaft, the epicyclic wheel carrier being mounted on said auxiliary shaft, braking means offering automatically variable resistance and adapted to act between the epicyclic wheel carrier and the epicyclic wheel to cause the transmission to be adapted to the load, said braking means comprising a central liquid-containing chamber within the epicyclic wheel carrier, a cylinder opening at one end to said chamber, the cylinder being provided at its outer end, a passage communicating with the said chamber, a piston operating within the cylinder, a non-return valve in the piston opening during each suction stroke, an eccentric within the chamber adapted to operate said piston in accordance with the rotational movement of the epicyclic wheel carrier, concentrically actuated controlling means within the communication passage between the cylinder and the central chamber, a driven shaft, a reversing gear rotatably mounted on said epicyclic wheel carrier, means whereby the wheel carrier can be selectively coupled either directly to said driven shaft or through said reversing gear, and a clamping means disposed between said auxiliary shaft and the epicyclic wheel carrier and adapted to couple said auxiliary shaft to the epicyclic wheel carrier or uncouple it therefrom, and a member extending axially through said driven shaft and adapted to operatively engage said clamp to render it operative or inoperative.

CARL MATHYS-MÜLLER.